(12) United States Patent
Hong et al.

(10) Patent No.: US 8,642,155 B2
(45) Date of Patent: *Feb. 4, 2014

(54) INFORMATION STORAGE MEDIUM USING NANOCRYSTAL PARTICLES, METHOD OF MANUFACTURING THE INFORMATION STORAGE APPARATUS INCLUDING THE INFORMATION STORAGE MEDIUM

(75) Inventors: Seung-bum Hong, Seongnam-si (KR);
Simon Buehlmann, Yongin-si (KR);
Shin-ae Jun, Seongnam-si (KR);
Sung-hoond Choa, Seoul (KR);
Eun-joo Jang, Suwon-si (KR);
Yong-kwan Kim, Yongin-si (KR)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/533,717

(22) Filed: Jun. 26, 2012

(65) Prior Publication Data

US 2012/0267703 A1    Oct. 25, 2012

Related U.S. Application Data

(63) Continuation of application No. 11/854,124, filed on Sep. 12, 2007, now Pat. No. 8,206,803.

(30) Foreign Application Priority Data

Feb. 6, 2007  (KR) .................... 10-2007-0012369

(51) Int. Cl.
*G11B 7/24*           (2013.01)
(52) U.S. Cl.
USPC ............... 428/64.1; 428/64.4; 430/270.11; 977/834

(58) Field of Classification Search
USPC ............ 428/64.4; 430/270.11; 977/834
See application file for complete search history.

(56) References Cited

U.S. PATENT DOCUMENTS

| 5,505,928 | A  | 4/1996  | Alivisatos et al. |
| 6,850,480 | B1 | 2/2005  | Naito et al. |
| 7,151,029 | B2 | 12/2006 | Bozano et al. |
| 7,826,174 | B2 | 11/2010 | Takahashi et al. |
| 8,206,803 | B2 | 6/2012  | Hong et al. |
| 2003/0228494 | A1 | 12/2003 | Ihara et al. |
| 2009/0155630 | A1 | 6/2009  | Momose et al. |

FOREIGN PATENT DOCUMENTS

| CN | 1193364        | 3/2005  |
| CN | 1684785        | 10/2005 |
| JP | 10-083586      | 3/1998  |
| KR | 10-2000-0011748 | 2/2000 |
| KR | 10-2005-0016702 | 2/2005 |
| WO | WO2007001274   | 1/2007  |

OTHER PUBLICATIONS

Office Action dated Oct. 26, 2010 from Japanese Application No. 2008/025257, 2 pages.
Office Action dated Oct. 29, 2009 from Chinese Application No. 2008100054383, 5 pages.
File History for U.S. Appl. No. 11/854,124.

*Primary Examiner* — Elizabeth Mulvaney
(74) *Attorney, Agent, or Firm* — Hollingsworth Davis, LLC (57) ABSTRACT

Provided is an information storage medium using nanocrystal particles, a method of manufacturing the information storage medium, and an information storage apparatus including the information storage medium. The information storage medium includes a conductive layer, a first insulating layer formed on the conductive layer, a nanocrystal layer that is formed on the first insulating layer and includes conductive nanocrystal particles that can trap charges, and a second insulating layer formed on the nanocrystal layer.

23 Claims, 5 Drawing Sheets

INFORMATION STORAGE MEDIUM USING NANOCRYSTAL PARTICLES, METHOD OF MANUFACTURING THE INFORMATION STORAGE APPARATUS INCLUDING THE INFORMATION STORAGE MEDIUM

CROSS-REFERENCE TO RELATED PATENT APPLICATIONS

This application is a continuation of U.S. patent application Ser. No. 11/854,124, filed on Sep. 12, 2007, which claims the benefit of Korean Patent Application No. 10-2007-0012369, filed on Feb. 6, 2007, in the Korean Intellectual Property Office, which are hereby incorporated by reference in their entireties.

BACKGROUND OF THE INVENTION

1. Field of the Invention

The present invention relates to an information storage medium, and more particularly, to an information storage medium using nanocrystal particles, a method of manufacturing the information storage medium, and an information storage apparatus including the information storage medium.

2. Description of the Related Art

In hard disk drives (HDDs) which are widely used as main storage apparatuses of computers, information is read or written by levitating a write/read head above an information storage medium while the information storage medium is rotated. In such HDDs, a magnetic recording method is generally used. That is, in a conventional HDD, a plurality of magnetic domains magnetized in a first direction and an opposite direction (hereinafter, a second direction) to the first direction are formed using a magnetic field, and the magnetic domains magnetized in the first and second directions respectively correspond to data values of '0' and '1'. Recording density of a HDD that uses the magnetic recording method has rapidly increased in the last few decades. However, due to a superparamagnetic effect, it is difficult to achieve recording densities of 500 Gb/in$^2$ or higher.

Therefore, to overcome the above limit of recording density, various solutions such as patterned media, heat assisted magnetic recording (HAMR), ferroelectric storage media, or probe recording have recently been suggested. However, none of these techniques are currently economically viable.

SUMMARY OF THE INVENTION

The present invention provides an information storage medium having a high recording density, a method of manufacturing the information storage medium, and an information storage apparatus including the information storage medium.

According to an aspect of the present invention, there is provided an information storage medium including: a conductive layer; a first insulating layer formed on the conductive layer; a nanocrystal layer that is formed on the first insulating layer and comprises conductive nanocrystal particles that can trap charges; and a second insulating layer formed on the nanocrystal layer.

The nanocrystal layer may have a monolayer or multilayer structure.

The conductive nanocrystal particles may be metal nanoparticles or semiconductor nanoparticles. The metal nanoparticles may be formed of at least a metal selected from the group consisting of Pt, Pd, Ni, Ru, Co, Cr, Mo, W, Mn, Fe, Os, Ph, Ir, Ta, Au, and Ag. The semiconductor nanoparticles may be formed of at least one semiconductor selected from the group consisting of a Group IV semiconductor, a Group II-VI compound semiconductor, a Group III-V compound semiconductor, and a Group IV-VI compound semiconductor.

The conductive nanocrystal particles may be distributed in an insulating material matrix. The nanocrystal layer may include the conductive nanocrystal particles and insulating nanocrystals. The conductive nanocrystal particles may be coated with an insulating material.

Each of the first insulating layer and the second insulating layer may be formed of at least one material selected from the group consisting of $SiO_2$, $SiO_xN_y$, $ZrO_2$, $HfON_x$, $ZrON_x$, $TiO_2$, $Ta_2O_5$, $La_2O_3$, $PrO_2$, $HfO_2$, $HfSiO_2$, $ZrSiO_2$, and $HfSiO_xN_y$. The conductive layer may be formed of a metal.

The information storage medium may further include a protective layer formed on the second insulating layer. A lubricant may be coated on the protective layer.

According to an aspect of the present invention, there is provided a method of manufacturing an information storage medium including: forming a conductive layer on a surface of a substrate; forming a first insulating layer on the conductive layer; forming a nanocrystal layer having conductive nanocrystals on the first insulating layer; and forming a second insulating layer on the nanocrystal layer.

The forming of the nanocrystal layer may include applying a dispersion of the conductive nanocrystals and insulating nanocrystals on the first insulating layer, followed by drying. The method may further include sintering the insulating nanocrystal particles.

The forming of the nanocrystal layer may include: applying a first dispersion of insulating nanocrystal particles on the first insulating layer and drying the first dispersion to form an insulating nanocrystal coating; applying a second dispersion of the conductive nanocrystal particles onto the insulating nanocrystal coating and drying the second dispersion to form a conductive nanocrystal coating; and applying a third dispersion of the insulating nanocrystal particles onto the conductive nanocrystal coating and drying the second dispersion.

The method may further include forming a protective layer on the second insulating layer, and may further include forming a lubricant coating on the protective layer.

According to an aspect of the present invention, there is provided an information storage apparatus including: an information storage medium; and an information write/read head that moves above a surface of the information storage medium to record information in the information storage medium or to read information from the information storage medium, wherein the information storage medium includes: a conductive layer; a first insulating layer formed on the conductive layer; a nanocrystal layer that is formed on the first insulating layer and includes conductive nanocrystal particles that can trap charges; and a second insulating layer formed on the nanocrystal layer.

The information write/read head may include: a semiconductor substrate that comprises a first surface facing the information storage medium and a second surface contacting an end of the first surface; a channel region which extends from a center portion of the end of the first surface towards the second surface and is doped by a dopant of a first concentration; a source region and a drain region respectively formed on sides of the channel region and doped by a dopant of a second concentration which is greater than the first concentration; an insulating film formed on the channel region on the second surface; and a write electrode formed on the insulating film.

Information recording may be realized by trapping electrons emitted from the write electrode by the conductive nanocrystal particles when a voltage is applied between the write electrode of the information write/read head and the conductive layer of the information storage medium.

Information reading may be realized by detecting a resistance change in the channel region due to electromagnetic field formed by the electrons trapped in the conductive nanocrystals.

The semiconductor substrate may be a p-type semiconductor and the channel region, the source region, and the drain region may be doped with an n-type dopant. Also, the semiconductor substrate may be an n-type semiconductor, and the channel region, the source region, and the drain region may be doped with a p-type dopant.

First and second electrodes may be respectively formed on the source and rain regions formed on the second surface of the semiconductor substrate. An air bearing surface (ABS) pattern may be formed on the first surface of the semiconductor substrate.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings in which exemplary embodiments of the invention are shown. In the drawings, the thicknesses of layers and regions are exaggerated for clarity, and like reference numerals refer to the like elements. Also, embodiments described hereinafter are exemplary, and can be embodied in various forms.

Figure 1:
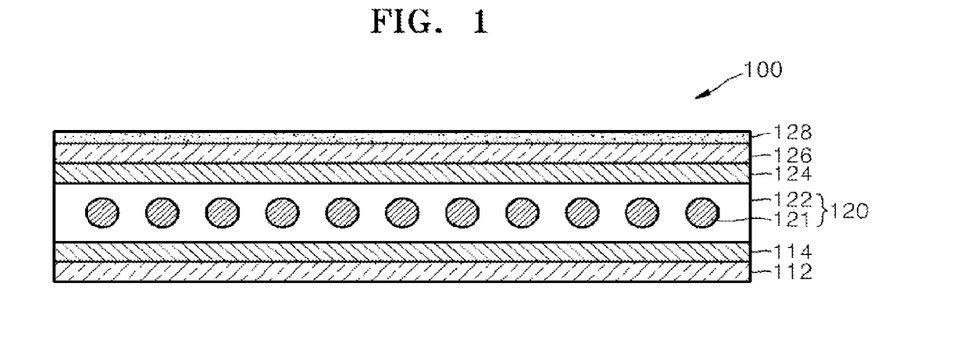
FIG. 1 is a schematic cross-sectional view illustrating an information storage medium according to an embodiment of the present invention.

FIG. 1 is a schematic cross-sectional View illustrating an information storage medium 100 according to an embodiment of the present invention.

Referring to FIG. 1, the information storage medium 100 according to the present embodiment of the present invention includes a conductive layer 112, a first insulating layer 114, a nanocrystal particle layer 120, and a second insulating layer 124. A substrate (not shown) is provided on a surface of the conductive layer 112, which is opposite to the surface where the first insulating layer 114 is provided. The conductive layer 112 can be formed of a metal.

The first insulating layer 114 is formed on a surface of the conductive layer 112. The first insulating layer 114 can be formed of at least a material selected from the group consisting of $SiO_2$, $SiO_xN_y$, $ZrO_2$, $HfON_X$, $ZrON_x$, $TiO_2$, $Ta_2O_5$, $La_2O_3$, $PrO_2$, $HfO_2$, $HfSiO_2$, $ZrSiO_2$, and $HfSiO_xN_y$, but is not limited thereto. These materials are known in the art and available from commercial sources.

The nanocrystal layer 120 having conductive nanocrystal particles 121 that can trap charges is formed on a surface of the first insulating layer 114, which is opposite to the surface where the conductive layer 112 is in contact with. The conductive nanocrystal particles 121 have the scale of several nanometers and each correspond to unit information. Therefore, the information storage medium 100 according to the present embodiment can have a recording density of 1 $Tb/in^2$ or higher.

The conductive nanocrystal particles 121 can be metal nanoparticles or semiconductor nanoparticles. The metal nanoparticles are formed of at least a metal selected from the group consisting of Pt, Pd, Ni, Ru, Co, Cr, Mo, W, Mn, Fe, Os, Ph, Ir, Ta, Au, and Ag. The metal nanoparticles can have a core-shell structure or a multi-layered shell structure. The semiconductor nanoparticles may be formed of at least one semiconductor material selected from the group consisting of a Group IV semiconductor, a Group II-VI compound semiconductor, a Group III-V compound semiconductor, and a Group IV-VI compound semiconductor. More specifically, the Group IV semiconductor nanoparticles may be formed of a semiconductor material selected from the group consisting of Si, Ge, SiC, and SiGe. The Group II-VI compound semiconductor nanoparticles can be formed of at least one semiconductor material selected from the group consisting of CdSe, CdTe, ZnS, ZnSe, ZnTe, ZnO, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, CdZnSeS, CdZnSeTe, CdZnSTe, CdHgSeS, CdHgSeTe, CdHgSTe, HgZnSeS, HgZnSeTe, and HgZnSTe. The Group III-V compound semiconductor nanoparticles can be formed of at least one semiconductor material selected from the group consisting of GaN, GaP, GaAs, GaSb, AlN, AlP, AlAs, AlSb, InN, InP, InAs, InSb, GaNP, GaNAs, GaNSb, GaPAs, GaPSb, AlNP, AlNAs, AlP As, AlPSb, InNP, InNAs, InNSb, InPAs, InPSb, GaAlNP, GaAlNAs, GaAlNSb, GaAlP As, GaAlPSb, GalnNP, GalnNAs, GalnNSb, GalnP As, GalnPSb, lnAlNP, lnAlNAs, lnAlNSb, lnAlPAs, and lnAlPSb. The Group IV-VI compound semiconductor nanoparticles can be formed of at least one semiconductor material selected from the group consisting of SnS, SnSe, SnTe, PbS, PbSe, PbTe, SnSeS, SnSeTe, SnSTe, PbSeS, PbSeTe, PbSTe, SnPbS, SnPbSe, SnPbTe, SnPbSSe, SnPbSeTe, and SnPbSTe. The semiconductor or metal materials may be evenly or unevenly distributed in individual nanoparticles. For example, when the nanoparticles have a core-shell structure or a multi-layered shell structure, the concentration of the semiconductor or metal material may vary in respective layers.

The nanocrystal particles may have various shapes. The preparation of the nanocrystal particles are known in the art, e.g., in U.S. Pat. No. 5,505,928, the content of which is incorporated herein by reference. The conductive nanocrystal particles 121 may be coated with an insulating material on their surface.

Figure 3:
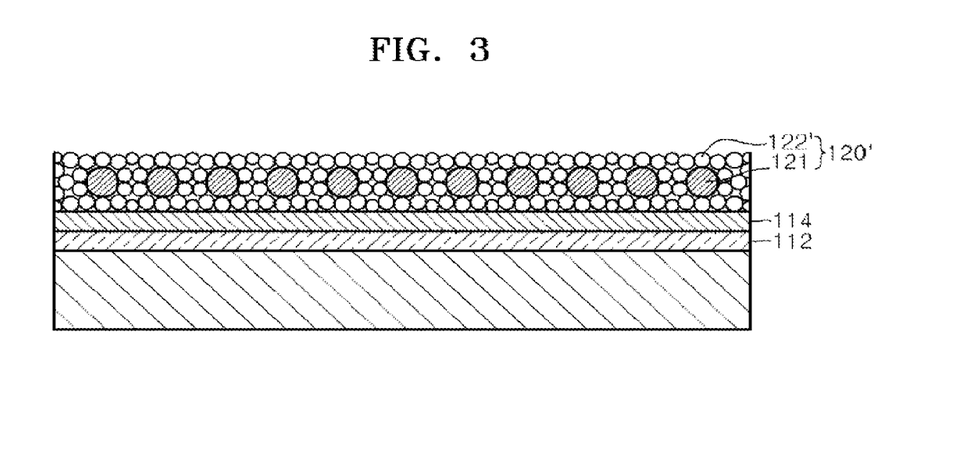

The nanocrystal layer 120 may have the conductive nanocrystal particles 121 disposed in the insulating matrix 122. The insulating matrix 122 can be formed of the same material used to form the lower insulating layer 114, for example, at least one material selected from the group consisting of $SiO_2$, $SiO_xN_y$, $ZrO_2$, $HfON_X$, $ZrON_x$, $TiO_2$, $Ta_2O_5$, $La_2O_3$, $PrO_2$, $HfO_2$, $HfSiO_2$, $ZrSiO_2$, and $HfSiO_xN_y$. The nanocrystal layer 120, as depicted in FIG. 3, may also be formed of the conductive nanocrystal particles 121 and insulating nanocrystal particles 122', as shown in FIG. 3. Although not shown, the nanocrystal layer 120 can be formed of conductive nanocrystal particles 121 coated with an insulating material. FIG. 1 depicts the nanocrystal layer 120 of a monolayer; but, the nanocrystal layer 120 can have a multiplayer structure.

The second insulating layer 124 is formed on the nanocrystal layer 120. The second insulating layer 124 can be formed of the same material used to form the lower insulating layer 114, for example, at least one material selected from the group consisting of $SiO_2$, $SiO_xN_y$, $ZrO_2$, $HfON_x$, ZrON, $TiO_2$, $Ta_2O_5$, $La_2O_3$, $PrO_2$, $HfO_2$, $HfSiO_2$, $ZrSiO_2$, and $HfSiO_xN_y$, but is not limited thereto.

A protective layer 126 for protecting the surface of the information storage medium 100 can further be formed on the second insulating layer 124. The protective layer 126 can be formed of, for example, diamond-like carbon (DLC), or can be formed of various materials. A lubricant 128 can be coated to reduce friction with an information write/read head 200 (refer to FIG. 6) which will be described later.

In the structure described above, when electrons that have been emitted from the information write/read head 200 and have passed through the second insulating layer 124 are trapped by the conductive nanocrystal particles 121, information is recorded. Also, when a resistance change caused by a magnetic field generated from the electrons trapped in the conductive nanocrystal particles 121 is detected by a channel region 212 of the information write/read head 200, information is read. In this way, in the information storage medium 100 according to the present embodiment, each of the conductive nanocrystal particles 121 corresponds to unit information. Thus, a recording density of approximately 1 $Tb/in^2$ or higher can be realized. Meanwhile, the temperature required for forming a recording layer of a ferroelectric storage medium is approximately 500° C. or higher; however, the temperature required for forming the nanocrystal layer 120 of the information storage medium 100 according to the present embodiment is lower than that of the ferroelectric storage medium, for example, approximately 350° C. or lower. Also, the thickness of the recording layer of the ferroelectric storage medium is 10 to 50 nm; however, in the information storage medium 100 according to the present embodiment, the thickness of the nanocrystal layer 120 is about 10 nm or less. Accordingly, the information storage medium 100 according to the present embodiment is more economically viable than a ferroelectric storage medium.

Hereinafter, a method of manufacturing the information storage medium 100 will now be described. FIGS. 2 through 5 are cross-sectional views illustrating a method of manufacturing an information storage medium 100 according to an embodiment of the present invention.

Figure 2:
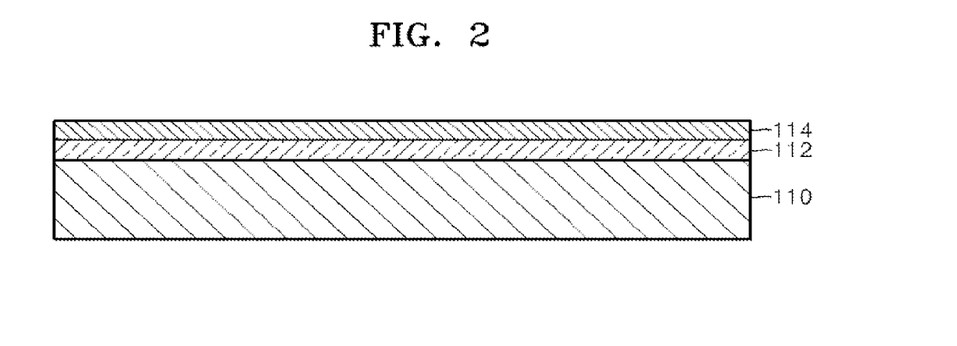
FIGS. 2 through 5 are cross-sectional Views illustrating a method of manufacturing an information storage medium according to an embodiment of the present invention.

Referring to FIG. 2, a conductive layer 112 and a first insulating layer 114 are sequentially formed on a substrate 110. The conductive layer 112 can be formed of a metal. As described above, the first insulating layer 114 can be formed of at least one material selected from the group consisting of $SiO_2$, $SiO_xN_y$, $ZrO_2$, $HfON_x$, $ZrON_x$, $TiO_2$, $Ta_2O_5$, $La_2O_3$, $PrO_2$, $HfO_2$, $HfSiO_2$, $ZrSiO_2$, and $HfSiO_xN_y$, but is not limited thereto.

Referring to FIG. 3, a composite of conductive nanocrystal particles 121 and insulating nanocrystal particles 122' is formed on the first insulating layer 114. The conductive nanocrystal particles 121 can trap charges and can be formed of metal or semiconductor nanoparticles. The insulating nanocrystal particles 122' can be formed of the same material used to form the insulating layers 114 or 124 described above. The composite can be formed by applying a dispersion containing the conductive nanocrystal particles 121 and the insulating nanocrystal particles 122' on the surface of the first insulating layer 114, followed by drying. Alternatively, the nanocrystal layer 120' may be formed using the following method. A dispersion of the insulating nanocrystal particles 122' is applied to the surface of the first insulating layer 114, followed by drying. Next, a dispersion of the conductive nanocrystal particles 121 is applied on the resulting coating of the insulating nanocrystal particles 122', followed by drying. Afterwards, the dispersion containing the insulating nanocrystal particles 122' is applied to cover the conductive nanocrystal particles 121, followed by drying, to form a nanocrystal layer 120'.

Figure 4:
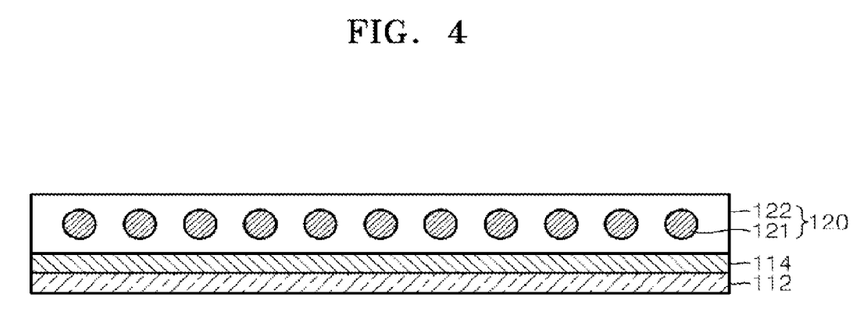

As depicted in FIG. 4, when the insulating nanocrystal particles 122' are sintered at a certain temperature, for example, approximately 350° C., a nanocrystal layer 120 comprising an insulating matrix 122 and the conductive nanocrystals 121 formed in the insulating matrix 122 can be formed. Although not shown, conductive nanocrystal particles 121 of the nanocrystal layer 120 can be coated with an insulating material on their surface.

Figure 5:
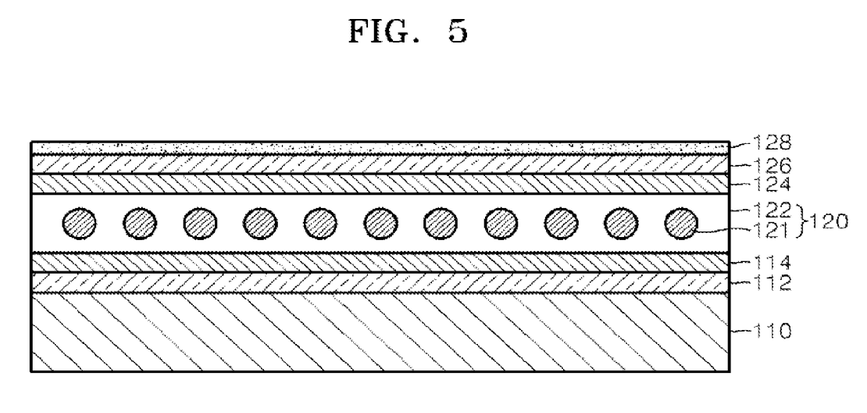

Referring to FIG. 5, a second insulating layer 124 is formed on the surface of the nanocrystal layer 120. The second insulating layer 124 can be formed of the same material used to form the first insulating layer 114. A protective layer 126 can further be formed on the surface of the second insulating layer 124. The protective layer 126 can be formed of, for example, DLC or can be formed of various materials. A lubricant 128 can further be coated on the surface of the protective layer 126. In FIGS. 2 through 5, the nanocrystal layer 120 is depicted as having a monolayer structure. However, the present embodiment is not limited thereto, and the nanocrystal layer 120 can be formed to have a multiplayer structure.

Figure 6:
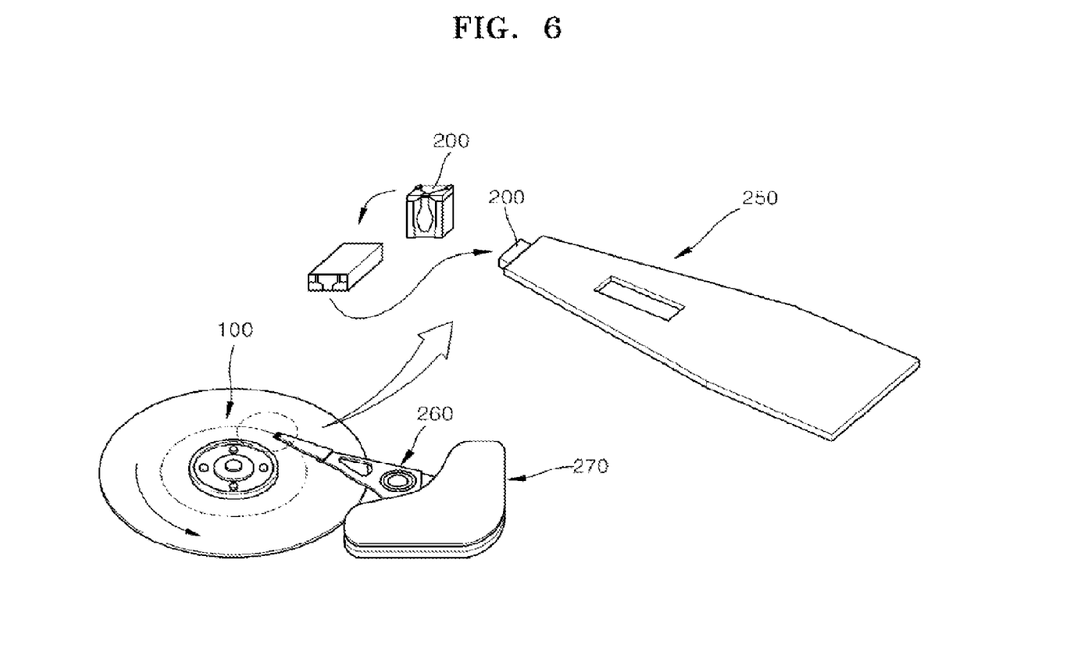
FIG. 6 is a perspective View of an information storage apparatus according to an embodiment of the present invention.
Figure 7:
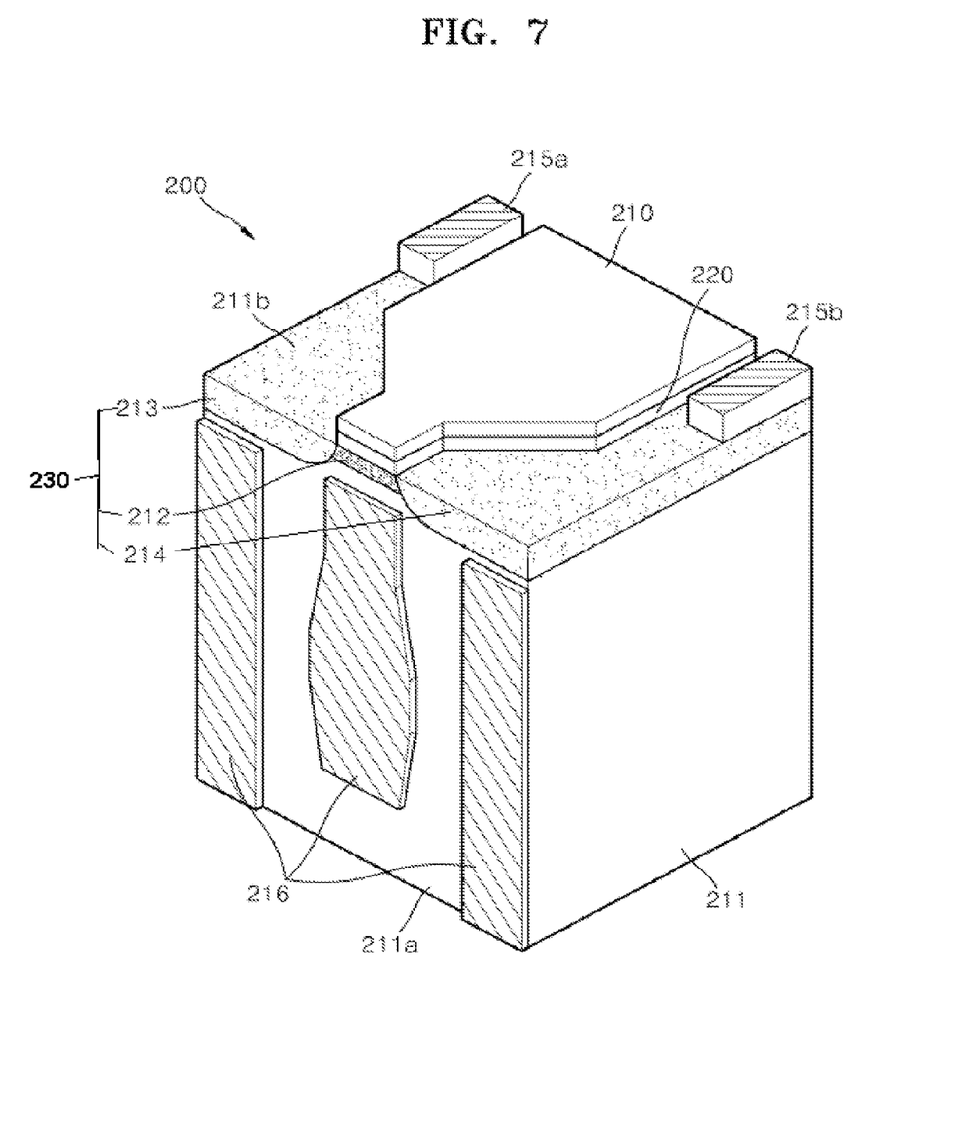
FIG. 7 is a perspective magnified view of an information write/read head of the information storage apparatus of FIG. 6, according to an embodiment of the present invention.
Figure 8:
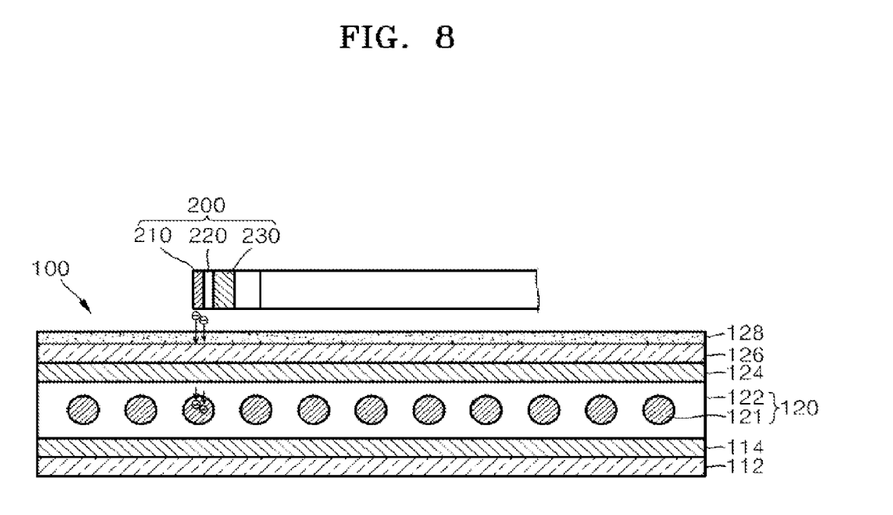
FIG. 8 is a cross-sectional view illustrating the information storage apparatus of FIG. 6, according to an embodiment of the present invention.

An information storage apparatus having the above information storage medium 100 will now be described. FIG. 6 is a perspective view of an information storage apparatus according to an embodiment of the present invention. FIG. 7 is a perspective magnified view of an information write/read head 200 of the information storage apparatus of FIG. 6, according to an embodiment of the present invention. FIG. 8 is a cross-sectional view illustrating the information storage apparatus of FIG. 6, according to an embodiment of the present invention.

Referring to FIGS. 6 through 8, the information storage apparatus according to the present embodiment includes an information storage medium 100 and an information write/read head 200 that writes information in the information storage medium 100 or reads information from the information storage medium 100 by moving above the surface of the information storage medium 100. The information storage medium 100 is disk-shaped and rotates. The information storage medium 100 is identical to the information storage medium 100 depicted in FIG. 1, and thus, a description thereof will not be repeated. The information write/read head 200 pivots while attached to a suspension 250 of a swing arm 260 and levitates from the surface of the information storage medium 100. A voice coil motor (VCM) 270 drives the swing arm 260.

The information write/read head 200 includes a semiconductor substrate 211 that includes a first surface 211a facing the information storage medium 100 and a second surface 211b that contacts an end of the first surface 211a, a channel region 212 which extends from the center portion of the end of the first surface 211a towards the second surface 211b and is doped with a dopant at a concentration, source and drain regions 213 and 214 formed on both sides of the channel region 212 and doped with the dopant at a higher concentration than that of the dopant in the channel region 212, an insulating film 220 formed on the channel region 212 which is formed on the second surface 211b, and a writing electrode 210 formed on the insulating film 220.

The semiconductor substrate 211 can be a silicon substrate or a silicon on insulator (SOI) substrate. The semiconductor substrate 211 is doped with a first dopant, and the channel region 212 and the source and drain regions 213 and 214 are doped with a second dopant. If the first dopant is a p-type dopant, the second dopant is an n-type dopant, and, if the first dopant is an n-type dopant, the second dopant is a p-type dopant.

The channel region 212 extends from the center portion of the end of the first surface 211a towards the second surface 211b. The channel region 212 can only extend to a part of the second surface 211b and may not extend to the end of the second surface 211b. The source and drain regions 213 and 214 are respectively formed on the sides of the channel region 212, and can extend to the end of the second surface 211b. First and second electrodes 215a and 215b respectively electrically connected to the source and drain regions 213 and 214 can be formed on the source and drain regions 213 and 214 on the second surface 211b.

The writing electrode 210 emits electrons when a voltage is applied between the writing electrode 210 and the conductive layer 112 of the information storage medium 100, and can be generally formed of a metal. An air bearing surface (ABS) pattern 216 can be formed on the first surface 211a of the semiconductor substrate 211 so that the information write/read head 200 can levitate from the surface of the information storage medium 100.

Referring to FIG. 8, in an information storage apparatus having the above structure, information is recorded using the following process. In FIG. 8, reference numeral 230 represents a read unit that includes a channel region 212 and source and drain regions 213 and 214 for reading information. When a predetermined voltage is applied between the writing electrode 210 formed on an edge of the information write/read head 200 and the conductive layer 112 formed in the information storage medium 100, electrons are emitted from the writing electrode 210. The emitted electrons pass through the lubricant 128, the protective layer 126, and the second insulating layer 124 and are trapped in the conductive nanocrystal particles 121 when they reach the nanocrystal layer 120, due to a tunnelling effect. In this way, information is recorded in the information storage medium 100 through the trapping of the electrons emitted from the write electrode 210 by the conductive nanocrystal particles 121.

The recorded information is read using the following process. When the channel region 212 of the information write/read head 200 is positioned above a predetermined conductive nanocrystal particle 121, an electromagnetic field generated from the electrons trapped in the conductive nanocrystal particle 121 changes the amount of major carriers in the channel region 212, and the change of the major carriers changes resistance, thereby reading information. When a voltage having a polarity opposite to the voltage applied between the writing electrode 210 and the conductive layer 112 to read information is applied between the writing electrode 210 and the conductive layer 112, the electrons trapped in the conductive nanocrystal particles 121 move to the writing electrode 210, and thus, information recorded in the information storage medium 100 is erased.

As described above, according to the present invention, since the information storage medium includes conductive nanocrystal particles that can trap charges, a recording density of 1 Tb/in$^2$ or higher can be realized. Also, the recording layer of the information storage medium according to embodiments of the present invention can be formed to be thinner than a recording layer of a ferroelectric storage medium, at a temperature lower than that used to form the recording layer of the ferroelectric storage medium. Accordingly, the information storage medium according to the present invention is more economically viable than a ferroelectric storage medium.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus, comprising:
   a conductive layer;
   a first insulating layer formed on a surface of the conductive layer;
   a nanocrystal layer formed on the first insulating layer and comprising conductive nanocrystal particles, the conductive nanocrystal particles comprising metal nanoparticles or semiconductor nanoparticles;
   a second insulating layer formed on the nanocrystal layer; and
   a protective layer formed on the second insulating layer.

2. The apparatus of claim 1, wherein the nanocrystal layer has a monolayer or multilayer structure.

3. The apparatus of claim 1, wherein the conductive nanocrystal particles comprise metal nanoparticles formed of at least a metal selected from the group consisting of Pt, Pd, Ni, Ru, Co, Cr, Mo, W, Mn, Fe, Os, Ph, Ir, Ta, Au, and Ag.

4. The apparatus of claim 1, wherein the conductive nanocrystal particles comprise semiconductor nanoparticles formed of at least a semiconductor selected from the group consisting of a Group IV semiconductor, a Group II-VI compound semiconductor, a Group III-V compound semiconductor, and a Group IV-VI compound semiconductor.

5. The apparatus of claim 1, wherein the nanocrystal layer comprises an insulating matrix in which the conductive nanocrystal particles are distributed.

6. The apparatus of claim 5, wherein the insulating matrix is formed of at least one selected from the group consisting of $SiO_2$, $SiO_xN_y$, $ZrO_2$, $HfON_x$, $ZrON_x$, $TiO_2$, $Ta_2O_5$, $La_2O_3$, $PrO_2$, $HfO_2$, $HfSiO_2$, $ZrSiO_2$, and $HfSiO_xN_y$.

7. The apparatus of claim 1, wherein the conductive nanocrystal particles are coated with an insulating material.

8. The apparatus of claim 1, wherein the protective layer is formed of diamond-like carbon (DLC).

9. An apparatus, comprising:
   an information storage arrangement; and
   an assembly configured to communicatively interact with the information storage arrangement, the information storage arrangement comprising:
   a conductive layer;
   a first insulating layer formed on a surface of the conductive layer;
   a nanocrystal layer formed on the first insulating layer and comprising conductive nanocrystal particles;
   a second insulating layer formed on the nanocrystal layer; and
   a protective layer formed on the second insulating layer.

10. The apparatus of claim 9, wherein the nanocrystal layer has a monolayer or multilayer structure.

11. The apparatus of claim 9, wherein the conductive nanocrystal particles are formed of a metal or a semiconductor.

12. The apparatus of claim 9, wherein the nanocrystal layer comprises an insulating matrix in which the conductive nanocrystal particles are distributed.

13. The apparatus of claim 9, wherein the information storage arrangement further comprises a lubricant coated on the protective layer.

14. The apparatus of claim 9, wherein the assembly comprises:
- a semiconductor substrate comprising a first surface facing the information storage arrangement and a second surface contacting an end of the first surface;
- a channel region extending from a center portion of the end of the first surface towards the second surface and doped by a dopant of a first concentration;
- a source region and a drain region respectively formed on sides of the channel region and doped by a dopant of a second concentration which is greater than the first concentration;
- an insulating film formed on the channel region on the second surface; and
- an information transfer feature formed on the insulating film.

15. The apparatus of claim 14, wherein information is transferred to the information storage arrangement by trapping electrons emitted from the information transfer feature by the conductive nanocrystal particles when a voltage is applied between the information transfer feature and the conductive layer of the information storage arrangement.

16. The apparatus of claim 14, wherein information is transferred from the information storage arrangement by detecting a resistance change in the channel region, the resistance change being generated by an electromagnetic field formed by the electrons trapped in the conductive nanocrystal particles.

17. The apparatus of claim 14, wherein first and second information transfer features are respectively formed on the source and drain regions formed on the second surface of the semiconductor substrate.

18. A method, comprising:
forming a conductive layer on a surface of a substrate;
forming a first insulating layer on the conductive layer;
forming a nanocrystal layer having conductive nanocrystal particles on the first insulating layer, the conductive nanocrystal particles comprising metal nanoparticles or semiconductor nanoparticles;
forming a second insulating layer on the nanocrystal layer; and
forming a protective layer on the second insulating layer.

19. The method of claim 18, wherein:
the forming of the nanocrystal layer comprises applying a dispersion of insulating nanocrystal particles and the conductive nanocrystal particles on the first insulating layer to form a coating; and
drying the coating.

20. The method of claim 19, further comprising sintering the insulating nanocrystal particles.

21. The method of claim 18, wherein the forming the nanocrystal layer comprises:
applying a first dispersion of insulating nanocrystal particles on the first insulating layer and drying the first dispersion to form an insulating nanocrystal coating;
applying a second dispersion of the conductive nanocrystal particles onto the insulating nanocrystal coating and drying the second dispersion to form a conductive nanocrystal coating; and
applying a third dispersion of the insulating nanocrystal particles onto the conductive nanocrystal coating and drying the second dispersion.

22. The method of claim 21, further comprising sintering the insulating nanocrystal particles.

23. The method of claim 18, further comprising coating a lubricant on the protective layer.

* * * * *

UNITED STATES PATENT AND TRADEMARK OFFICE
CERTIFICATE OF CORRECTION

| | | |
|---|---|---|
| PATENT NO. | : 8,642,155 B2 | Page 1 of 1 |
| APPLICATION NO. | : 13/533717 | |
| DATED | : February 4, 2014 | |
| INVENTOR(S) | : Seung-bum Hong et al. | |

It is certified that error appears in the above-identified patent and that said Letters Patent is hereby corrected as shown below:

On the title page, item (54) and in the specification, column 1, line 1,

The title of the application should read: Information Storage medium Using Nanocrystal Particles, Method of Manufacturing the Information Storage Medium, and Information Storage Apparatus Including the Information Storage Medium Signed and Sealed this
Twenty-ninth Day of April, 2014

Michelle K. Lee
*Deputy Director of the United States Patent and Trademark Office*